(12) United States Patent
Getze et al.

(10) Patent No.: US 11,555,506 B2
(45) Date of Patent: Jan. 17, 2023

(54) PUMP ARRANGEMENT

(71) Applicant: Lutz Pumpen GmbH, Wertheim (DE)

(72) Inventors: Andrej Getze, Kreuzwertheim (DE); Linus Goetz, Kuelsheim (DE); Matthias Roehl, Erlenbach am Main (DE)

(73) Assignee: Lutz Pumpen GmbH, Wertheim (DE)

( * ) Notice: Subject to any disclaimer, the term of this patent is extended or adjusted under 35 U.S.C. 154(b) by 0 days.

(21) Appl. No.: 17/398,209

(22) Filed: Aug. 10, 2021

(65) Prior Publication Data

US 2022/0082108 A1    Mar. 17, 2022

(30) Foreign Application Priority Data

Sep. 15, 2020   (DE) .......................... 102020124007.4

(51) Int. Cl.
| | | |
|---|---|---|
| *F04D 29/049* | (2006.01) | |
| *F04D 13/02* | (2006.01) | |
| *F04D 13/06* | (2006.01) | |
| *F04D 13/08* | (2006.01) | |

(52) U.S. Cl.
CPC ......... *F04D 29/049* (2013.01); *F04D 13/026* (2013.01); *F04D 13/0626* (2013.01); *F04D 13/08* (2013.01); *F16C 2360/44* (2013.01)

(58) Field of Classification Search
CPC .... F04D 29/043; F04D 29/046; F04D 29/065; F04D 29/12; F04D 13/06; F04D 13/08
See application file for complete search history.

(56) References Cited

U.S. PATENT DOCUMENTS

| | | | | |
|---|---|---|---|---|
| 4,875,827 A | * | 10/1989 | Gschwender | ........... F16C 33/26 384/301 |
| 5,441,390 A | | 8/1995 | Rapp | |
| 6,007,313 A | * | 12/1999 | Sigel | ................... F04D 29/0413 417/424.1 |
| 6,350,101 B1 | * | 2/2002 | Fertig | ..................... F04D 13/08 415/157 |
| 2012/0073800 A1 | * | 3/2012 | Janitz | .................... E21B 43/128 166/105 |
| 2017/0321710 A1 | * | 11/2017 | Schutsky | ............... B22D 39/00 |

FOREIGN PATENT DOCUMENTS

| | | | | |
|---|---|---|---|---|
| DE | 2334495 A | * | 1/1975 | ........... F04D 29/648 |
| DE | 000002443794 A1 | | 3/1976 | |
| DE | 2334495 A1 | | 9/1976 | |

(Continued)

*Primary Examiner* — Topaz L. Elliott
*Assistant Examiner* — Jackson N Gillenwaters
(74) *Attorney, Agent, or Firm* — Von Rohrscheidt Patents

(57) ABSTRACT

A pump arrangement for a drum or container pump, the pump arrangement including a pump housing; a drive shaft support tube received in the pump housing; and a drive shaft rotatably supported in the drive shaft support tube at a rotor side bearing and at a pump arrangement coupling, wherein the drive shaft runs freely between the rotor side bearing and the pump arrangement coupling, wherein the drive shaft runs through the at least one support ring that is fixed relative to the pump housing and that has an inner diameter that is greater than an outer diameter of the drive shaft and that is arranged between the rotor side bearing and the pump arrangement coupling.

6 Claims, 3 Drawing Sheets

(56) References Cited

FOREIGN PATENT DOCUMENTS

| | | | |
|---|---|---|---|
| DE | 2505919 | A1 | 9/1976 |
| GB | 651619 | A | 4/1951 |
| GB | 1215969 | A | 3/1976 |
| JP | S57163198 | A | 10/1982 |
| JP | 2001220605 | | 8/2001 |
| KR | 101715604 | B1 | 3/2017 |

* cited by examiner

PUMP ARRANGEMENT

RELATED APPLICATIONS

This application claims priority from German patent application DE 10 2020 124 007.4 filed on Sep. 15, 2020, which is incorporated in its entirety by this reference.

FIELD OF THE INVENTION

The invention relates to a pump arrangement, in particular for a drum or container pump, the pump arrangement comprising a pump housing including a drive shaft received in the pump housing rotatably supported in a drive shaft support tube at a rotor side bearing and at a pump arrangement coupling.

BACKGROUND OF THE INVENTION

Generic pump arrangements are well known in the art. In particular drum or container pumps have significantly longer drive shafts than other comparable fluid flow machines. Thus, known pump arrangements in particular without seals include several drive shaft bearings within the drive shaft support tube.

However, this requires closer fabrication tolerances and increases complexity. Dry running is particularly problematic since it causes high temperatures in the bearings which cannot dissipate their heat into a medium whereas a rotational speed can be very high due to absence of any load. This can be counter acted by special materials or an encapsulated lubrication system.

The first solution causes higher material cost whereas the second solution is critical because the lubricant can exit the bearing due to wear and contaminate the medium.

In view of these facts dry running means emergency operations for known pump arrangements and therefore has to be prevented or at least time limited. Therefore, constant monitoring of the pump is required to recognize dry running and to take proper action. Dry running is an even more serious problem for explosion protected applications due to certification requirements of the pump.

BRIEF SUMMARY OF THE INVENTION

Improving upon the known pump arrangements it is an object of the invention to provide a pump arrangement which can also be operated risk free when running dry.

The object is achieved by a pump arrangement for a drum or container pump, the pump arrangement including a pump housing; a drive shaft support tube received in the pump housing; and a drive shaft rotatably supported in the drive shaft support tube at a rotor side bearing and at a pump arrangement coupling, wherein the drive shaft runs freely between the rotor side bearing and the pump arrangement coupling, wherein the drive shaft runs through the at least one support ring that is fixed relative to the pump housing and that has an inner diameter that is greater than an outer diameter of the drive shaft and that is arranged between the rotor side bearing and the pump arrangement coupling.

Advantageous embodiments of the pump arrangement can be derived from the subsequent dependent claims.

According to the invention a pump arrangement, in particular a pump arrangement of a drum or container pump includes a drive shaft support tube that supports a drive shaft. The drive shaft is supported in a pump arrangement coupling on a side of a pump drive whereas the drive shaft is rotatably supported in a bearing on a side of a seat module. This bearing is provided as a normal bearing, thus no special materials or encapsulation, and facilitates operating the pump without a seal in addition to supporting the drive shaft.

Differently from the known pump arrangements the pump arrangement according to the invention does not include an intermediary bearing between the pump arrangement coupling and the bearing in the seal module. According to the invention one or plural support rings are provided that are introduced into the drive shaft support tube or the seal module and attached therein so that the drive shaft runs through the at least one support ring. Thus, the at least one support ring has an inner diameter that is greater than an outer diameter of the drive shaft so that the drive shaft does not contact the support ring as long as it rotates without vibration in a no-load condition. Only when the drive shaft starts to vibrate due to increasing speed and load and, in particular when the drive shaft reaches a resonance frequency, it contacts the at least one support ring which assures only in this situation that the drive shaft does not impact the drive shaft support tube. In order to dampen the vibration that is generated as a function of operating conditions at least one support ring is arranged in an upper portion of the seal module.

Using this type of support prevents high temperatures even during dry running since there is no friction in the intermediary bearings. Since friction at the support ring only occurs when the drive shaft vibrates additional intermediary bearings as well as lubricants or special materials can be omitted.

In a particularly advantageous embodiment, an inner diameter of the support ring is sized and selected so that it is substantially greater than an outer diameter of the drive shaft supported therein so that the drive shaft does not contact the support ring when running without vibration and only contacts the support ring when the drive shaft starts vibrating.

Advantageously the support ring can be attached in the drive shaft support tube or in the seal module using a press fit as long as the support ring is a simple hollow cylinder made from a suitable material mechanical as well as chemical connection devices and agents can be omitted.

Advantageous materials for the support ring are carbon and ceramics due to their low friction coefficient and long service life and their usability in explosion protected applications since they prevent spark generation.

Advantageously plural support rings can be arranged in the drive shaft support tube which do not contact the drive shaft when it is standing still or during vibration free dry running. This way resonance vibrations at different axial locations of the drive shaft can be prevented.

BRIEF DESCRIPTION OF THE DRAWINGS

The invention is now described based on an advantageous embodiment with reference to drawing figures, wherein.

DETAILED DESCRIPTION OF THE INVENTION

Figure 1:
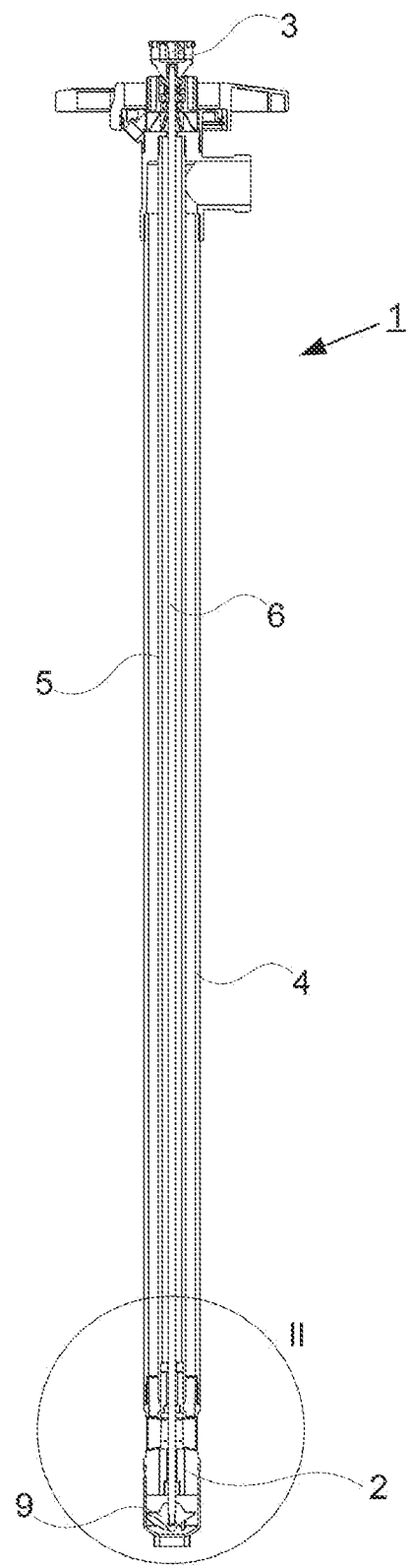
FIG. 1 illustrates a cross sectional view of the pump arrangement according to the invention including a drive shaft supported at a pump arrangement coupling and at a bearing in a seal module wherein the drive shaft runs with a clearance through a support ring that is arranged between the pump arrangement coupling and the bearing in the seal module.

FIG. 1 illustrates a pump arrangement 1 including a tubular pump housing that receives a drive shaft 6 that is enveloped by a drive shaft support tube 5. A pump arrangement 1 of this type can be used for a drum or container pump. In this case the pump arrangement 1 is lowered into the container from a top side until a seal module 2 at a free end of the pump arrangement 1 reaches an area of the so-called pump sump. Rotating the drive shaft 6 including a rotor 9 which is connected torque proof to an end of the drive shaft 6 on a side of seal module 2 feeds a medium in the container between the wall of the pump housing 4 and the drive shaft support tube 5 in upward direction to an outlet and from there to a filling location. The drive is provided by a pump motor that is operatively connected with a pump arrangement coupling 3.

During operations of the pump motor and associated rotation of the drive shaft dry running can occur, thus a rotation of the drive shaft 6 without feeding a medium in the pump housing 4. Since an intermediary bearing between the pump arrangement coupling 3 and an end bearing 8 in the seal module 2 is omitted the drying running does not generate any frictional heat at the intermediary bearings so that the illustrated pump arrangement 1 can also be operated when running dry. When the drive shaft 6 starts vibrating during a dry run or under load, in a worse-case scenario vibrating in a resonance frequency range that leads to standing waves, a considerable deflection of the drive shaft can be caused so that the drive shaft impacts a wall of the drive shaft support tube 5.

Figure 2:
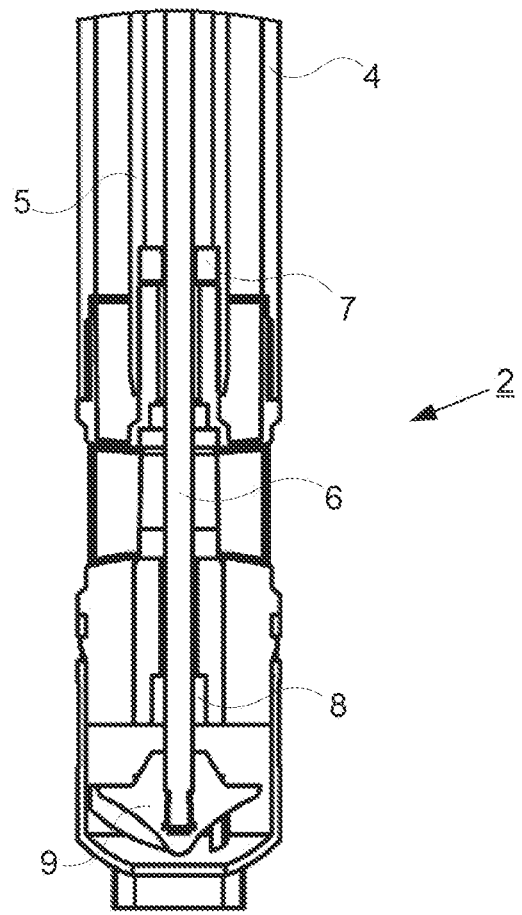
FIG. 2 illustrates a detail of FIG. 1 showing a lateral cross-sectional view of the seal module with the support ring pressed into the drive shaft support tube.

This is prevented by the invention as illustrated in FIG. 2. In an area of the seal module 2 the drive shaft 6 is run through a support ring 7 which is configured as a hollow cylinder made from carbon or ceramic material or pressed into the drive shaft support tube 5. Only when the drive shaft 6 starts vibrating it impacts an inner surface of the support ring 7 wherein an inner diameter of the inner surface of the support ring is greater than an outer diameter of the drive shaft 6. Thus, any friction at the support ring 7 is prevented during smooth operations and excessive vibration of the drive shaft 6 is also prevented since the support ring 7 prevents any additional deflection beyond a deflection that is specified by the diameter of the inner surface of the support ring 7.

Figure 3:
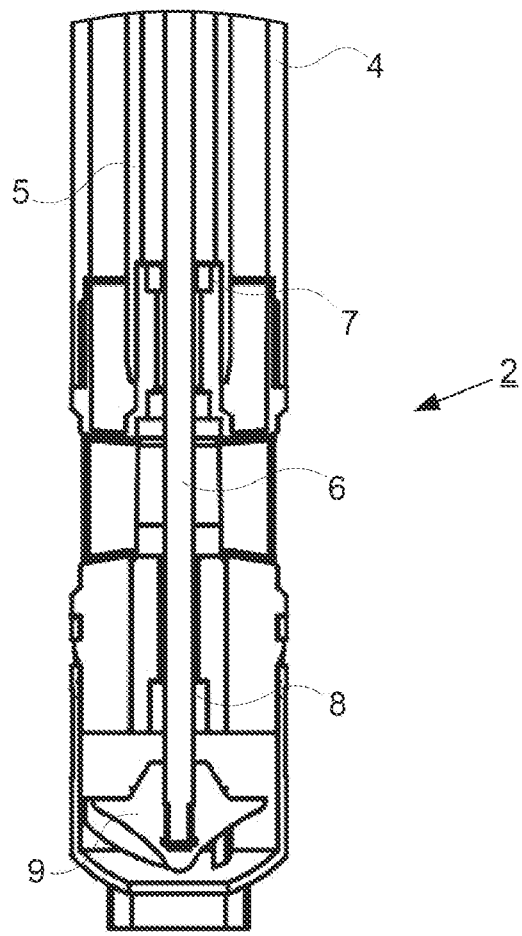
FIG. 3 illustrates an embodiment according to FIG. 2 and a lateral cross-sectional view showing the support ring pressed into the seal module.

FIG. 3 illustrates a variation of the embodiment of FIG. 2 where the support ring 7 is not received in the drive shaft support tube 5 but in the seal module 2. Also here the support ring 7 is stationary whereas the drive shaft 6 is able to rotate freely. Only when the drive shaft 6 vibrates it comes in contact with the support ring 7 which prevents further increase of the vibration. Both solutions can be used individually or in combination when plural support rings 7 are being used.

The pump arrangement according to the invention can be operated dry without any risk without requiring bearings made from special materials or an encapsulated lubrication system.

REFERENCE NUMERALS AND DESIGNATIONS 1 pump arrangement
2 seal module
3 pump arrangement coupling
4 pump housing
5 drive shaft support tube
6 drive shaft
7 support ring
8 bearing
9 rotor

What is claimed is:

1. A pump arrangement for a drum or container pump, the pump arrangement comprising:
a pump housing;
a drive shaft support tube received in the pump housing; and
a drive shaft rotatably supported in the drive shaft support tube at a rotor side bearing and at a pump arrangement coupling,
wherein the drive shaft runs freely without an intermediary bearing between the rotor side bearing and the pump arrangement coupling,
wherein the drive shaft runs through the at least one support ring that is fixed relative to the pump housing and that has an inner diameter that is substantially greater than an outer diameter of the drive shaft and that is arranged between the rotor side bearing and the pump arrangement coupling.

2. The pump arrangement according to claim 1, wherein the drive shaft does not contact the at least one support ring when the drive shaft runs without vibration and only contacts the support ring when the drive shaft vibrates.

3. The pump arrangement according to claim 1, wherein the at least one support ring is received in the drive shaft support tube or pressed into the drive shaft support tube.

4. The pump arrangement according to claim 1, wherein the at least one support ring is received in a seal module or pressed into the seal module.

5. The pump arrangement according to claim 1, wherein the rotor side bearing or the at least one support ring are made from a carbon or ceramic material.

6. The pump arrangement according to claim 1, wherein plural support rings are arranged along a length of the drive shaft support tube.

* * * * *